G. L. SWABB.
GEAR.
APPLICATION FILED APR. 22, 1915.

1,176,787. Patented Mar. 28, 1916.

Witnesses
B. M. Hartman
Mrs. B. G. Brugger

Inventor
George L. Swabb
By
Attorneys

UNITED STATES PATENT OFFICE.

GEORGE L. SWABB, OF ERIE, PENNSYLVANIA, ASSIGNOR TO HEISLER LOCOMOTIVE WORKS, OF ERIE, PENNSYLVANIA, A CORPORATION OF PENNSYLVANIA.

GEAR.

1,176,787.	Specification of Letters Patent.	Patented Mar. 28, 1916.

Application filed April 22, 1915. Serial No. 23,053.

*To all whom it may concern:*

Be it known that I, GEORGE L. SWABB, a citizen of the United States, residing at Erie, in the county of Erie and State of Pennsylvania, have invented new and useful Improvements in Gears, of which the following is a specification.

This invention relates to gears and consists in certain improvements in the construction thereof as will be hereinafter fully described and pointed out in the claims.

Heretofore it has been common to replace gears in positions where it is inconvenient to remove the shaft by splitting the gear as a whole and replacing the gear by a split gear, the two parts being clamped together on a shaft. This often results in a faulty running gear in that any variation in the size of the shaft interferes with the proper spacing of the teeth. Further with the split gear it is difficult to secure the parts of the gear together so as to properly carry the strain from the hub.

The present invention is intended to get the benefit accruing from the use of split gears without the disadvantages arising therefrom.

The invention is illustrated in the accompanying drawings as follows:—

Figure 1:
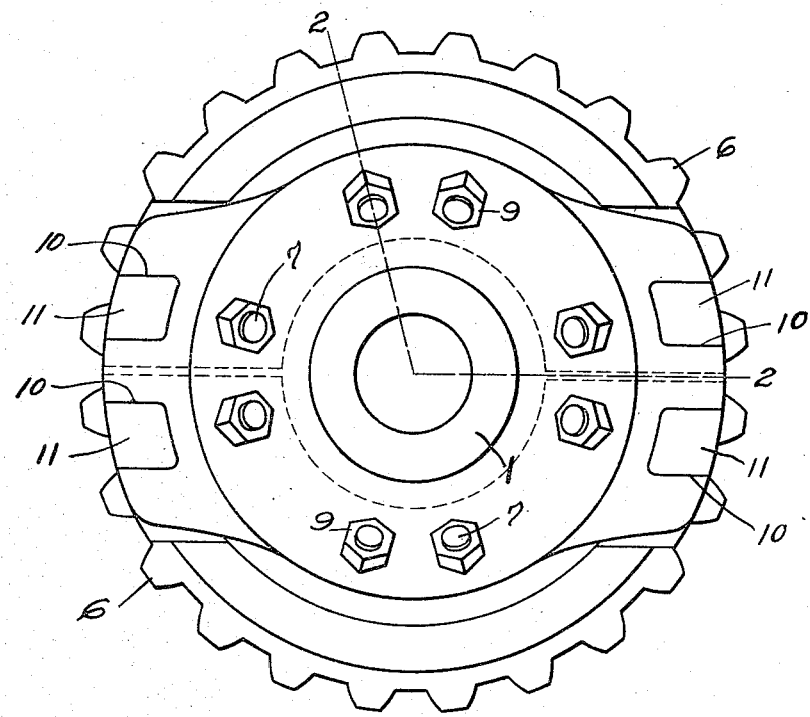
Figure 2:
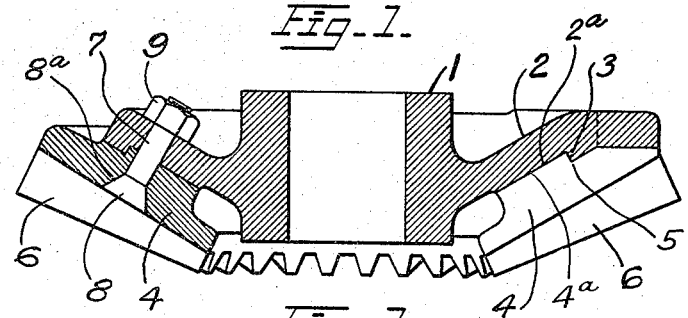
Figure 3:
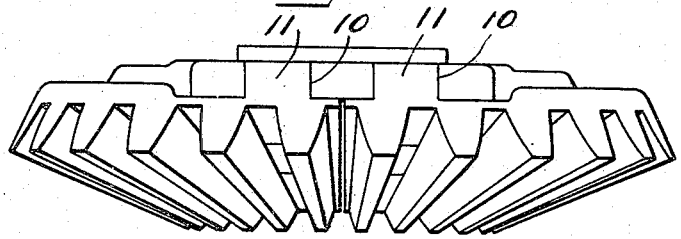

Figure 1 shows a rear view of the gear. Fig. 2 a section on the radial lines 2—2 in Fig. 1. Fig. 3 a side elevation, the point of view being from the side of Fig. 1.

1 marks the hub, 2 the gear backing, and 3 an annular shoulder at the outer edge of the backing. The backing has the conical backing surface $2^a$.

Gear segments are formed with the plates 4 having an interior conical surface $4^a$ corresponding to the surface $2^a$ and with an annular shoulder 5 adapted to engage the shoulder 3 so as to accurately center the gear segments. Gear teeth 6 are arranged on the outer surface of the plates 4. The gear segments are clamped to the backing by means of bolts 7. These bolts have the heads 8 which are arranged between the teeth of the gear segments and are drawn down through the space between the teeth into a countersunk opening $8^a$ in the gear segments. Nuts 9 are arranged on the bolts at the inside of the backing. It will be observed that the bolts are at right angles to the conical surfaces so that they will lock the segments in place irrespective of the clamping action of the nuts 9, that is to say, the several bolts 7 extending at right angles to the surface will not permit of the removal of the segments without the removal of the bolts.

While the bolts by their clamping action and by their keying action lock the gear segments against turning on the backing, I prefer to provide the backing and gear segments with interlocking segmental teeth. These are formed by making the openings 10 in the backing and the projections or shoulders 11 on the gear segments which fit into these openings. It will be readily observed that these gear faces may be readily renewed with the hub in place on the shaft and that the gears when renewed are accurately centered and accurately spaced with relation to the teeth.

What I claim as new is:—

1. In a gear, the combination of an annular backing comprising a hub; a conical backing surface; and a centering shoulder; gear segments having inner conical surfaces corresponding to the surface on the backing; shoulders engaging the shoulder on the backing; and means for clamping the segments on the surfaces and against the shoulder.

2. In a gear, the combination of an annular backing comprising a hub; a conical backing surface; and a centering shoulder; gear segments having inner conical surfaces corresponding to the surface on the backing; shoulders engaging the shoulder on the backing; and bolts extending at right angles to the surface through the backing and segments.

3. In a gear, the combination of an annular backing comprising a hub; a conical backing surface; and a centering shoulder; gear segments having inner conical surfaces corresponding to the surface on the backing; shoulders engaging the shoulder on the backing; and bolts extending at right angles to the surface through the backing and segments, and having heads arranged between the teeth on the gear segments.

4. In a gear, the combination of an annular backing comprising a hub; a conical backing surface; and an annular centering shoulder; gear segments having inner conical surfaces corresponding to the surface on the backing; shoulders engaging the annular shoulder on the backing; and means for clamping the segments on the surfaces and against the shoulder.

5. In a gear, the combination of an annular backing comprising a hub; a conical backing surface; gear segments having inner conical surfaces corresponding to the surface on the backing, said segments and backing having interlocking teeth; and means for clamping the segments on the surfaces and against the shoulder.

6. In a gear, the combination of an annular backing comprising a hub; a conical backing surface; and a centering shoulder; gear segments having inner conical surfaces corresponding to the surface on the backing; shoulders engaging the shoulder on the backing, said backing and gear segments having interlocking teeth; and means for clamping the segments on the surfaces and against the shoulder.

7. In a gear, the combination of an annular backing comprising a hub; a conical backing surface; and a centering shoulder; gear segments having inner conical surfaces corresponding to the surface on the backing; shoulders engaging the shoulder on the backing, said backing and gear segments having interlocking teeth; and bolts extending at right angles to the surface through the backing and segments.

In testimony whereof I have hereunto set my hand in the presence of two subscribing witnesses.

GEORGE L. SWABB.

Witnesses:
H. R. JEFFS,
D. E. SHREVE.

Copies of this patent may be obtained for five cents each, by addressing the "Commissioner of Patents, Washington, D. C."